Nov. 17, 1970  C. S. ODSON  3,541,488

THERMOSTATICALLY CONTROLLED SYSTEM

Filed May 22, 1969

INVENTOR.
CLIFFORD S. ODSON
BY
McNENNY, FARRINGTON, PEARNE & GORDON
ATTORNEYS

United States Patent Office 3,541,488
Patented Nov. 17, 1970

3,541,488
THERMOSTATICALLY CONTROLLED SYSTEM
Clifford S. Odson, Mansfield, Ohio, assignor to Therm-O-Disc Incorporated, Mansfield, Ohio, a corporation of Ohio
Filed May 22, 1969, Ser. No. 826,797
Int. Cl. H01h 37/04, 37/52
U.S. Cl. 337—13                    13 Claims

ABSTRACT OF THE DISCLOSURE

A thermostatically controlled heater system for gutters or downspouts. This system includes a thermostat which operates the system only when temperatures are reached which are below normal environmental temperatures. The thermostat is provided with a shorting or testing switch which can be operated to test the system while the thermostatically operated switch remains open. The thermostat is enclosed within a tubular envelope which is closed at its ends. The material of the envelope and the insulation for the leads connected to the thermostat are thermoplastic and fused together when the ends of the tube are heat sealed. Therefore, the thermostat is hermetically sealed. The shorting or testing switch is operable by pressing inward from the exterior of the envelope. The envelope material is sufficiently transparent to permit the shorting or testing switch to be seen from the exterior of the envelope.

BACKGROUND OF INVENTION

This invention relates generally to thermostatically controlled systems and more particularly to a novel and improved thermostatically controlled system including separate switch means which may be used for system testing or the like.

In some thermostatically controlled systems the thermostat is calibrated to maintain a switch open condition under normal environmental temperatures encountered. In such a system, the thermostat operates to a switch close condition only when the temperature is above or below normal temperatures. One example of such a system is an electrical heater system installed along the gutters and downspouts of homes to prevent the build-up of ice at these locations. In such a system which is provided with a thermostat to automatically turn the system on and off, the thermostat is calibrated to close and energize the system only when the temperature drops to a temperature at which the icing problem is encountered. Such a thermostat remains open when the environmental conditions are substantially above freezing. In such a system, where the thermostat is exposed to the elements, it is enclosed to keep out dust, dirt and moisture.

Heater systems of this type are normally installed or repaired when the temperature is substantially above freezing. It is therefore been difficult, in the past, to test this system to determine if it is properly connected because the thermostat is open at such time. In many instances it was not determined that the system was not functioning properly until cold weather arrived and system failure occurred.

A similar situation occurs in a system intended for operation only when high temperatures are encountered. For example, a thermostatically controlled attic fan is provided with a thermostat which remains open at normal environmental temperatures and closes only when high temperatures are encountered. Here again, installation and repair of such systems often occurs at temperatures below normal operation temperatures of the system and similar testing problems are presented.

PRIOR ART

Thermostats with separate manually operable switches are known. Examples of such thermostats are illustrated in the United States Letters Patent Nos. 2,652,468 and 2,793,268.

SUMMARY OF INVENTION

A thermostatically controlled system according to this invention provides a unitary thermostat assembly which provides two switches connected in parallel. One switch is thermally operated by a thermosensing device calibrated to maintain the switch open under normal environmental conditions. The other switch is a normally opened, manually operable switch which may be closed to energize the associated system for testing or the like. The thermostat is normally connected between a source of electrical power and an electrically controlled load. The thermostat itself and the connections thereof with the source and load are enclosed within a flexible electrically insulating envelope so that dirt, dust or moisture cannot enter the thermostat and cause damage or malfunction. In the illustrated embodiment, the envelope is formed of a flexible thermoplastic material such as polyvinyl chloride or the like which is heat sealed at its end. Preferably, the connector leads connected to the thermostat are also provided with thermoplastic insulation of a type which bonds with the envelope during heat sealing to produce a hermetically sealed thermostatically controlled system.

The illustrated envelope is formed of a material which is sufficiently transparent to permit the manually operated switch to be seen from the exterior of the envelope so that the user can press on the envelope at the proper location to close the manually operated switch. The thermostatic body is also formed so that the thermally responsive element and the thermally operated switch are not contacted by the envelope when the manually operated switch is operated. Therefore, the calibration of the thermostat is not changed by the operation of the manually operated switch.

DESCRIPTION OF THE DRAWINGS

Referring to FIG. 1, one system in accordance with this invention includes a two wire supply line 10, a closed loop resistance heater 11, and a thermostat assembly 12 operable to connect the heater 11 with the supply line. The supply line may be provided with a typical plug 13 to connect it with a source of electrical power.

Referring to FIGS. 2 and 3, the thermostat assembly 12 includes a thermostat 14 enclosed within a flexible envelope 16. In the illustrated embodiment the flexible envelope 16 is formed of a tubular piece of a thermoplastic material such as polyvinyl chloride which is heat sealed at its ends 17 and 18. In this embodiment, the insulation 19 on the lead wire 10 and the insulation 21 on the heater 11 are also formed of a thermoplastic material which fuses with the material forming the envelope 16 when the heat sealing is performed. The illustrated heater 11 is provided with two heater conductors 22 and 23 which are held in a fixed spaced relationship by the insulation 21 and are connected at their ends remote from the thermostat by a connector 24. One of the two lead wires 26 is connected to the heater wire 22 within the envelope 16 by a connector 27. The other lead wire 28 is connected to a terminal 29 on the thermostat 14 and the second heater wire 23 is connected to a terminal 31 on the thermostat 14.

Figure 1:
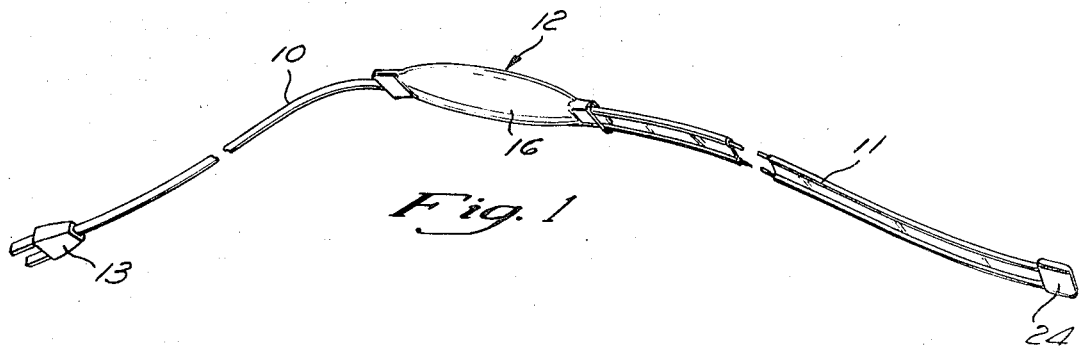
FIG. 1 is a perspective view of a gutter heater system incorporating this invention wherein a thermostat enclosed with a hermetically sealed envelope is connected between the supply line and the resistance heater portion of the system.
Figure 2:
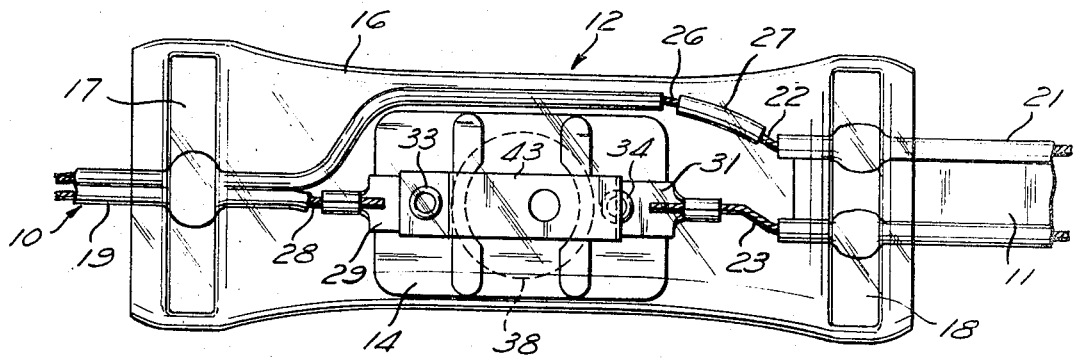
FIG. 2 is an enlarged fragmentary view illustrating the thermostat, in plan view, the connections between the supply and load, and the envelope which encloses the thermostat and the connections.

The thermostat 14 includes a rigid body 32 preferably molded from a plastic material such as a phenolic resin or the like. The terminal 29 is secured to the body 32 by a rivet 33. Similarly, the terminal 31 is secured to the body 32 by a rivet 34. A thermostatically operated switch is provided by a spring switch arm 36 secured at one end to the body 32 by the rivet 33 and extending to a position adjacent to the rivet 34. A contact 37 mounted on the free end of the arm 36 is movable into engagement with the rivet 34 when the switch is closed. The arm 36 is formed so that it is resiliently urged toward the closed position. A bi-metallic snap disc 38 is positioned between the body 32 and the spring arm 36. The various elements are proportioned so that one edge 39 of the disc 38 is held against the body by the spring arm 36 and the opposite edge 41 is engageable with the spring arm at a location substantially adjacent to the contact 37. A pivot projection 42 is formed on the body to engage the disc 38 substantially at its center.

The disc is formed so that it has two positions of stability. It snaps between these two positions when predetermined temperatures occur. In the position of stability illustrated in FIG. 3, the disc holds the contact 37 spaced from the rivet 34 and when the disc snaps to its opposite position of stability, the spring arm 36 carries the contact 37 into engagement with the rivet 34 to close the switch. A thermostat having this type of disc mounting and operation is illustrated in the United States Letters Patent No. 3,322,920 and reference may be made to that patent for a more detailed description of such a thermostat.

Figure 3:
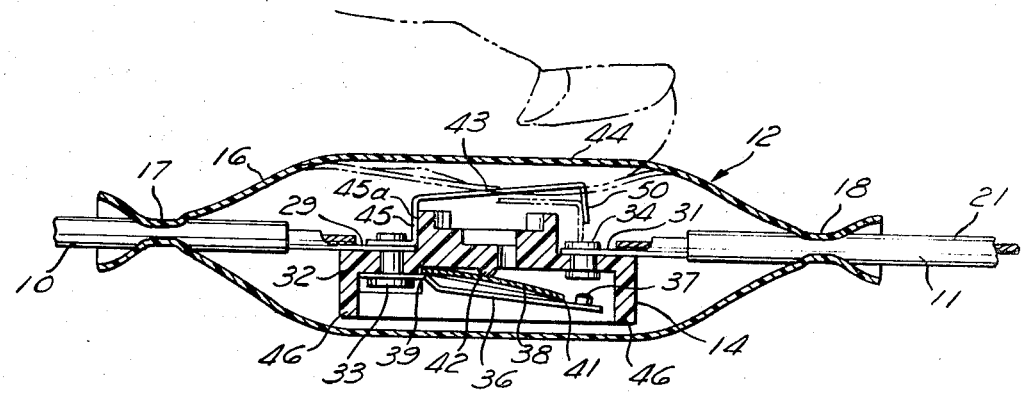
FIG. 3 is a fragmentary side elevation in longitudinal section illustrating the structural detail of the thermostat and also illustrating, in phantom, the operation of the manual operable switch.

The thermostat 14 is also provided with a shorting or testing switch. The testing switch includes a strip of spring metal, providing a switch arm 43. The switch arm 43 is secured to the body 32 by the rivet 33 and extends exteriorly of the body 32 to a position adjacent to the rivet 34. The arm 43 is formed so that when it is in its unstressed condition it is spaced from the rivet 34 as illustrated in FIG. 3. The envelope 16 is proportioned so that its adjacent wall portion 44 is normally spaced from the switch arm 43. However, when the wall portion 44 is pressed inwardly as illustrated in phantom in FIG. 3, it engages the switch arm 43 and causes it to deflect inwardly, until it engages the rivet 34. When this is done, the manually operable switch arm 43 shorts out the thermostat and connects the heater 11 to the supply line 10. When the pressure is released, the portion 44 and the arm 43 spring back to their normal position.

The switch arm is formed with an upstanding portion 45 which fits against a mating face 45a on the body 32 and cooperates with the rivet mounting to insure that the switch arm will remain in its proper position with respect to the body. The other end of the switch arm is provided with a depending portion 50 which extends substantially perpendicular to the terminal to an edge engageable with the rivet 34. With this structure, substantial pressures can be applied to the switch arm 43 without causing it to be permanently bent or pushed out of position.

The body 32 is formed with depending flanges 46 which extend around the switch cavity enclosing the disc 38 and switch arm 36. The flange is proportioned so that when the envelope 16 is pressed inwardly to operate the manual switch 43, the envelope does not contact either the switch arm 36 or the disc 38. Therefore, the calibration of the thermostat is not affected by operation of the manual switch.

In the illustrated embodiment wherein the heater 11 is intended for use as a gutter and downspout heater, the snap disc 38 is calibrated so that it is in the position illustrated in FIG. 3, when the environmental temperature is substantially above freezing. The disc however, snaps through to the opposite position of stability, to allow the thermostatically operated switch to close when the temperature drops to a temperature at which icing conditions occur. Therefore, the thermostat operates automatically to turn the heater on, only when its operation is required, and to shut the system off when heating is not required.

Since such heater systems are usually installed or repaired when the temperature is well above freezing, such installation and repair work usually occurs while the thermostat remains open. With this invention, however, it is merely necessary to squeeze the envelope to close the manually operated shorting switch 43 when it is desired to test the system. As soon as the envelope is released, it springs back to the full line position and the system is in proper condition for thermostatic operation.

The thermostat is preferably mounted within the envelope 16 so that the plane of movement of the manual switch is substantially perpendicular to the plane of the heat sealed portions 17 and 18. Since the normal tendency of a user is to press the envelope in a plane perpendicular to the plane of the heat seals, this arrangement properly positions the manual switch for operation when the envelope is squeezed in the way that is normal for most people. However, it is also desirable to form the envelope of a material which is sufficiently transparent so that the manually operated switch 43 can be seen through the wall of the envelope.

In the illustrated embodiments, the heat sealing along the areas 17 and 18 completely closes the ends of the envelope and seals with the insulation of the lead wire 10 and heater wire 11 so the thermostat is hermetically sealed and cannot be damaged by the elements even when it is located in the gutter, in the downspout, or in the roof area.

In installations, where the thermostatic assembly is intended to operate other types of loads, the thermostat is often connected between a lead wire from the electrical supply and a second lead wire connected to the load. For example, such a thermostat assembly is suitable for use to control the operation of an attic fan. In such an instance, however, the thermostat is calibrated to close on temperature rise when the environmental temperature in the attic increases to a predetermined temperature, normally above environmental air temperature. A thermostatic assembly in accordance with this invention is also particularly desirable for such an installation since the thermostat is fully protected against the elements, while still providing easy testing to determine that the system is in condition for proper operation.

Although a preferred embodiment of this invention is illustrated, it is to be understood that various modifications and re-arrangements may be resorted to without departing from the scope of the invention disclosed.

What is claimed is:

1. A thermostatically controlled system comprising an electrically controlled load, an electrical supply, and a thermostat connected between said load and supply; said thermostat including a thermally operated switch operable between an opened and closed position, thermally responsive means connected to control said switch, and a manually operable switch connected in parallel with said thermally operated switch, said thermally responsive means being operable to hold said switch open under normal environmental temperatures, and a flexible envelope of electrically insulating material enclosing said thermostat, said envelope being sufficiently flexible to permit manual operation of said manual switch by pressing the surface of said envelope.

2. A thermostatically controlled system as set forth in claim 1 wherein said envelope is sufficiently transparent to permit said manually operable switch to be seen on the exterior thereof.

3. A thermally controlled system as set forth in claim 1 wherein said load and supply are connected to said thermostat by insulated connectors, and said envelope is a unitary tube sealed at its ends to the insulation of said connectors to hermetically seal said thermostat.

4. A thermostatically controlled system as set forth in claim 3 wherein said envelope and the insulation on said connectors are formed of thermoplastic material, and said ends are heat sealed.

5. A thermostatically controlled system as set forth in claim 3 wherein said seals at the end of said tubes are located substantially in a first plane, and said manually operable switch is operative by movement in a second plane substantially perpendicular to said first plane.

6. A thermostatically controlled system as set forth in claim 5 wherein said thermostat includes a body, and said manually operable switch includes a strip of spring metal extending exteriorly of said body substantially adjacent to a wall portion of the said envelope.

7. A thermostatically controlled system as set forth in claim 6 wherein said envelope is formed of a material which springs back to its initial position when released.

8. A thermostatically controlled system as set forth in claim 1 wherein said thermally responsive means is bi-metal, and said thermostat includes a rigid body proportioned to prevent contact of said envelope with both said bi-metal and said thermostatically operated switch when said envelope is pressed to operate said manual switch whereby operation of said manual switch does not adversely affect the calibration of said thermostat.

9. A thermostatically controlled system as set forth in claim 1 wherein said thermostat is provided with a pair of terminals one of which is connected to said electrical supply and the other of which is connected to said electrically controlled load, said manual switch is a piece of spring metal mounted at one end on a first of said terminals and extending to a position adjacent to a second of said terminals, said piece of spring metal being formed so that it is normally spaced from said second terminal and is deflectable into contact therewith by the pressing of said envelope, 10. A thermostatically controlled system as set forth in claim 9 wherein said envelope provides an electrical insulation cover over the entire thermostat and prevents physical contact with said piece of spring metal.

11. A thermostat assembly comprising a body, a thermostatically controlled switch mounted on said body, a bi-metal snap disc on said body operably connected to move said thermostatically controlled switch between its opened and closed position, a pair of terminals on said body with one connected to each side of said thermostatically controlled switch, a piece of spring metal mounted at one end on one of said terminals and extending exteriorly of said body to a position adjacent to the other of said terminals, said piece of spring metal being normally spaced from said other terminal and being deflectable into contact therewith, and an envelope formed of flexible electrically insulating material enclosing said thermostat, said envelope being deflectable into engagement with said piece of spring metal to cause it to engage said other terminal, said body being formed so that external pressure applied to said envelope does not cause contact thereof with either said snap disc or said thermally operated switch.

12. A thermostat assembly as set forth in claim 11 wherein said envelope is sufficiently transparent to permit said piece of spring metal to be seen from the exterior thereof.

13. A thermostat assembly as set forth in claim 11 wherein said spring metal includes a first portion secured to said one terminal, a second portion adjacent thereto extending substantially perpendicular to said first portion along a mating surface of said body, and a third portion adjacent to the free end thereof extending toward said other terminal substantially perpendicularly relative thereto.

References Cited

UNITED STATES PATENTS

| | | |
|---|---|---|
| 3,322,920 | 5/1967 | Morris _____ 337—363 XR |
| 2,812,402 | 11/1957 | Dixon. |
| 2,793,268 | 5/1957 | Franklin _____ 337—13 |
| 2,727,116 | 12/1955 | Alfred et al. |
| 2,516,584 | 7/1950 | Parr. |
| 2,343,060 | 2/1944 | Horning. |

BERNARD A. GILHEANY, Primary Examiner

D. M. MORGAN, Assistant Examiner

U.S. Cl. X.R.

200—159, 168; 337—16, 37, 112, 333, 380